Figure 1:
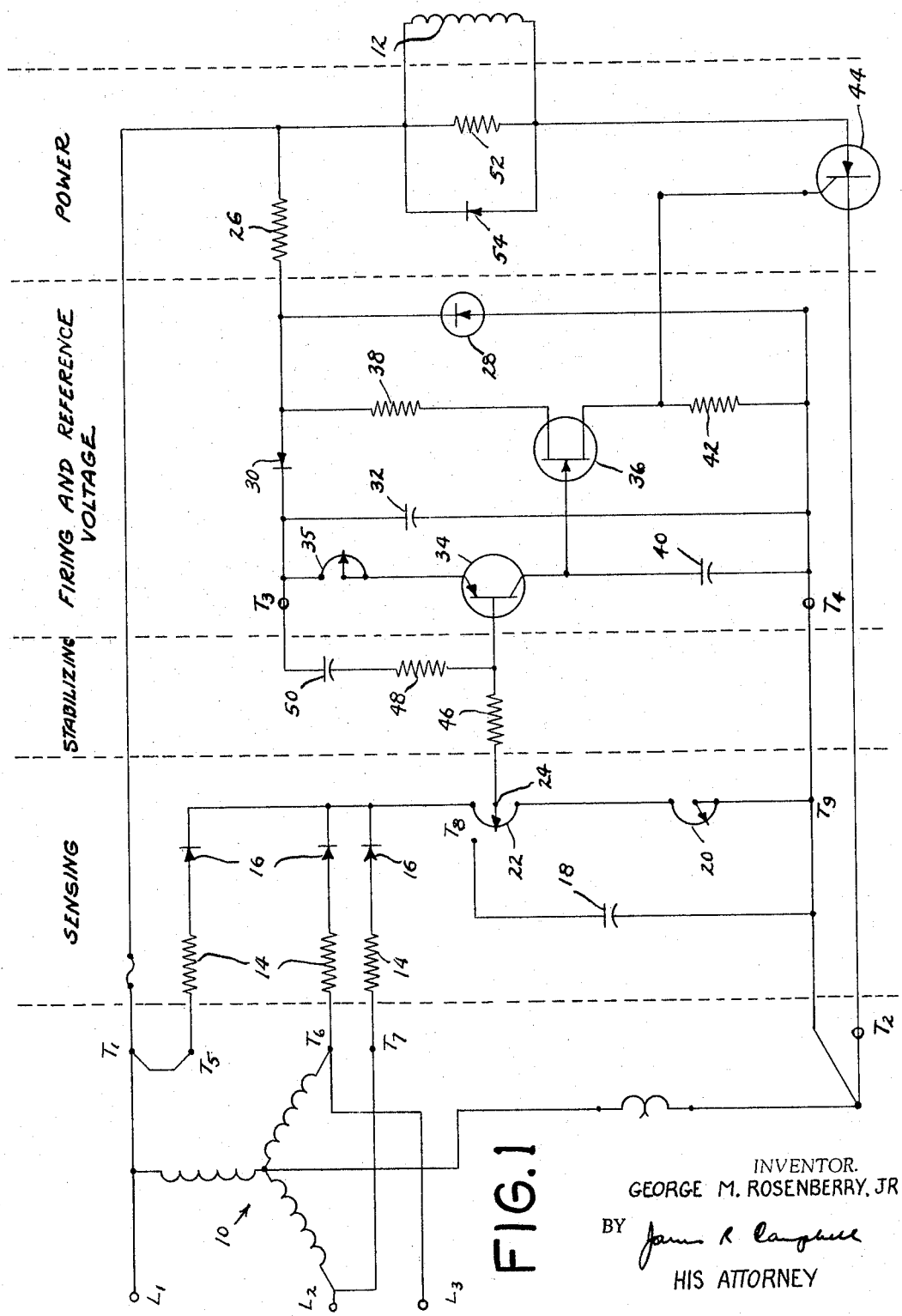

Nov. 29, 1966 G. M. ROSENBERRY, JR 3,289,071
VOLTAGE REGULATOR
Filed Nov. 20, 1963 5 Sheets-Sheet 2

INVENTOR.
GEORGE M. ROSENBERRY, JR.
BY James R. Campbell
HIS ATTORNEY

Nov. 29, 1966  G. M. ROSENBERRY, JR  3,289,071
VOLTAGE REGULATOR

Filed Nov. 20, 1963  5 Sheets-Sheet 3

INVENTOR.
GEORGE M. ROSENBERRY, JR.

BY *[signature]*

HIS ATTORNEY

INVENTOR.
GEORGE M. ROSENBERRY, JR.
BY James R Campbell
HIS ATTORNEY

United States Patent Office 3,289,071
Patented Nov. 29, 1966

3,289,071
VOLTAGE REGULATOR
George M. Rosenberry, Jr., Schenectady, N.Y., assignor to General Electric Company, a New York corporation
Filed Nov. 20, 1963, Ser. No. 325,041
8 Claims. (Cl. 322—28)

The invention described herein relates to regulators and more particularly to an improved low cost, high performance regulator designed to perform a control function in a wide variety of different types of electrical equipment.

The regulator disclosed in my prior patent application Serial No. 220,624, filed August 31, 1962, now Patent No. 3,121,836, and assigned to the same assignee as the present invention, is of a static type particularly useful in maintaining the output voltage of an alternator at a predetermined constant value. According to that invention, the regulator is connected between the alternator output terminals and the input terminals to an exciter, or directly to the alternator field winding. When changes in the load served by the alternator occur, circuits are provided which sense such changes and then match them against a reference voltage for obtaining a difference or error voltage. This error voltage is effective in energizing a firing circuit which converts a semiconductor device to a conducting state, thereby permitting the application of excitation power to the exciter or alternator field winding and in an amount sufficient to maintain a constant voltage output at the alternator terminals.

Many applications of this regulator to generating equipment clearly shows it to be of high performance and efficiency and free from that maintenance normally associated with power regulating apparatus. However, the regulator is relatively limited to the control of constant voltage electrical generating equipment over a limited frequency range. For example, a design suitable for 50–60 cycles per second would not be satisfactory for 400 cycles per second. To obtain different operating characteristics to suit different user requirements, minor changes and adjustments must be made to the regulator but these have a direct bearing on the manufacturing costs. Upon recognizing such limitations and those inherent in prior art designs, it became apparent the need existed for an improved regulator of the same high performance but having more universal application and of lower cost.

It further was apparent the design preferably should include basic circuits so that with minor modifications to other circuits in the regulator, it would find use in controlling a wide range of different types of equipment. Consideration of these factors led to the conclusion the regulator should meet the important requirements of low cost, high performance, and an ability to lend itself to the control of a wide range of electrical equipment.

The primary object of my invention therefore is to fulfill the above-identified needs through the provision of a regulator of new and unique design and having highly flexible characteristics.

In carrying out my invention, I provide a regulator incorporating basic circuits which permit its adaptation to many different installations. The basic regulator includes sensing, stabilizing, firing and reference voltage circuits and a power circuit useful in controlling a generator furnishing constant voltage to a load. By making minor modifications to one or more of these basic circuits, the regulator may be used for example, with eddy current couplings furnishing constant speed to motor driven equipment in controlling the speed of a direct current shunt wound motor, and the like. Depending on the control requirements for the particular equipment, the regulator easily is convertible from half to full wave rectification, and vice versa, to make it more suitable for higher power applications. It also may be used in regulating the volts per cycle wherein the voltage is maintained proportional to frequency under a wide range of frequencies.

Figure 2:
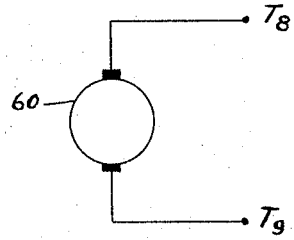
Figure 3:
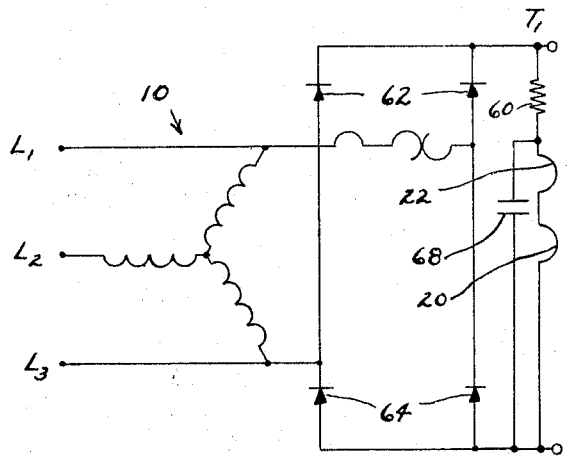
Figure 4:
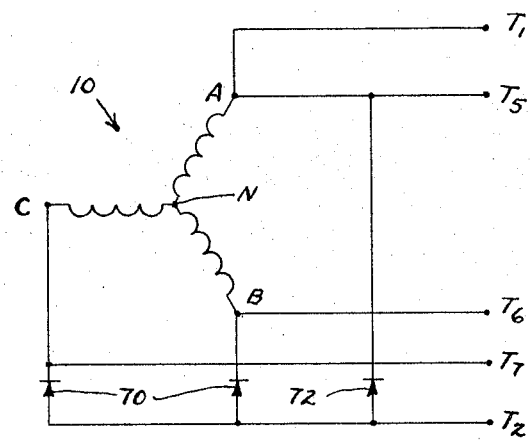
Figure 5A:
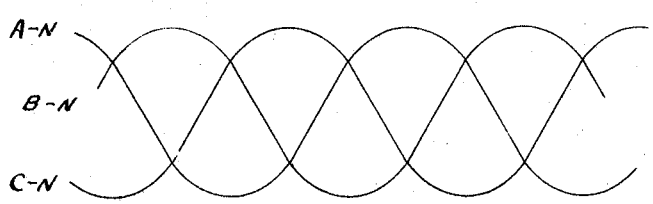
Figure 5B:
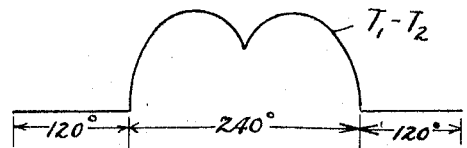
Figure 6:
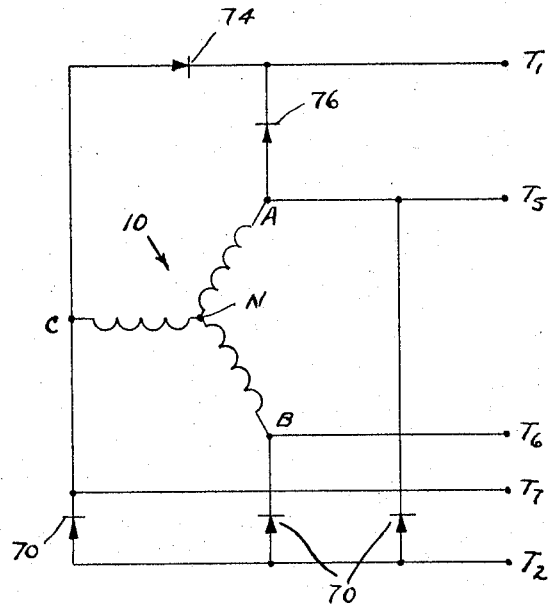
Figure 8:
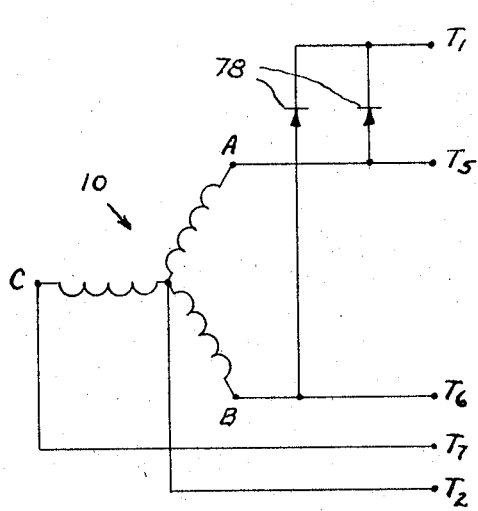
Figure 10:
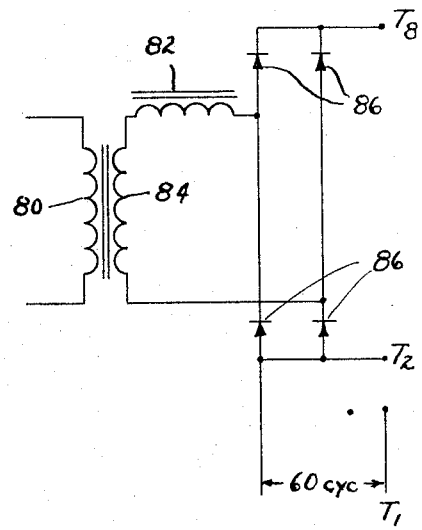
Figure 9A:
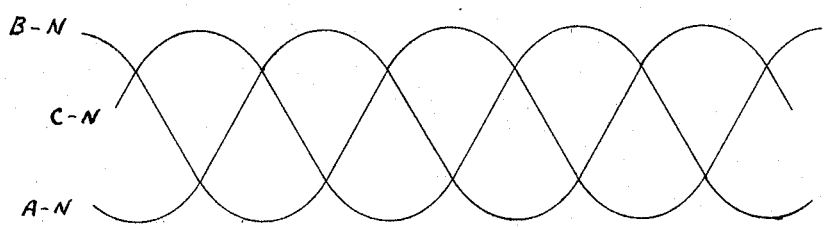
Figure 11:
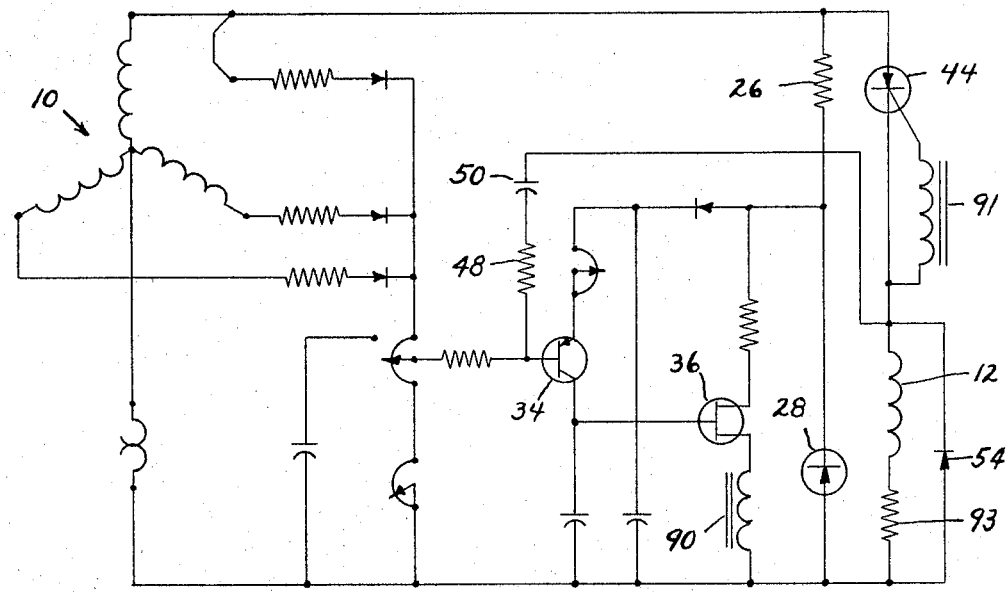
Figure 12:
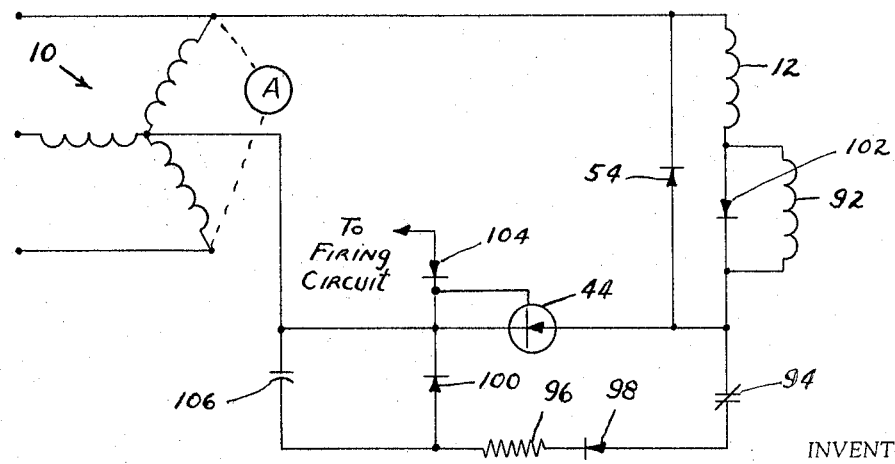

While the specification concludes with claims particularly pointing out and distinctly claiming the subject matter which I regard as my invention, it is believed the invention will be better understood from the following description taken in connection with the accompanying drawings in which:

FIGURE 1 illustrates a voltage regulator incorporating circuits useful in performing a control function;
FIGURE 2 is a modification wherein an electrical tachometer senses and supplies voltage to a sensing circuit;
FIGURE 3 is another modification of the sensing circuit wherein a full wave rectifier bridge comprises the voltage source;
FIGURE 4 is a modification of the sensing and power circuit useful in obtaining application of a unidirectional voltage to the exciter field for 240°;
FIGURE 5 illustrates curves showing the time and magnitude of the voltage applied to the exciter field;
FIGURE 6 is a modification similar to FIGURE 4 for obtaining application of power to the exciter field for up to 360°;
FIGURE 7 illustrates the curves applicable to the modification of FIGURE 6;
FIGURE 8 is still another modification of the power circuit, while FIGURE 9 shows the curves corresponding to it;
FIGURE 10 is a full wave rectifier bridge supplied with power from a transformer and inductance for supplying power to the sensing circuit so that the regulator will regulate voltage proportional to frequency;
FIGURE 11 is a modification to the stabilizing circuit shown in FIGURE 1; and
FIGURE 12 is a circuit arrangement used for flashing the field of the exciter.

Referring now to the drawings wherein like reference characters designate like or corresponding parts throughout the several views, there is shown in FIGURE 1, a basic design of regulator incorporating sensing, stabilizing, firing and reference voltage and power circuits useful in performing a control and regulating function. The FIGURE 1 design of regulator chosen to illustrate the invention holds the alternator output voltage constant as changes occur in the load requirements. When the load voltage varies from a predetermined value, the sensing circuit detects such changes and provides a rectified voltage to the stabilizing circuit where it is compared with a reference voltage. When a difference exists, the firing circuit operates to convert a silicon controlled rectifier to a conducting state for the positive half cycle, thus applying D.C. power to the exciter field winding to establish the field strength necessary for maintaining the alternator output voltage constant.

Referring more specifically to FIGURE 1, the armature winding 10 for a 3 phase synchronous generator is shown having terminals $L_1$, $L_2$, and $L_3$ arranged for connection to a load. The power from one phase of the alternator is supplied to an exciter field winding 12 through the conductors having terminals $T_1$ and $T_2$. It also serves as the power source for the regulator and is furnished to the sensing circuit through terminals $T_1$ and jumper connection to $T_5$, $T_6$ and $T_7$, through resistors 14 and rectifiers 16 respectively connected in each of the phases of the alternator armature winding 10.

The resistors 14 and rectifiers 16 reduce and rectify the voltage in this particular application from 240 volts A.C. to approximately 25 volts D.C. To provide for a range of adjustment on the sensed voltage, a rheostat 20 is connected in the circuit along with a potentiometer 22 which provides the fine adjustment. These resistive elements are used initially for adjusting the output voltage on the alternator and at any time thereafter when the load conditions require changing to a different value. The voltage appearing at point 24 is held constant by the regulator.

The ripple in the voltage supplied to the sensing circuit compares favorably with that produced by a three-phase bridge. However, further reduction in the ripple often is desirable especially when single phase voltages are sensed. This is accomplished by connecting capacitor 18 to the output from the rectifiers 16. Single phase sensing therefore is provided for, either from a single phase generator or from one phase of a three phase alternator. When three phase voltages are sensed the capacitor 18 need not be connected in the circuit.

Turning now to the firing circuit, the line to neutral voltage ($T_1$–$T_2$) of about 140 volts comprises the source voltage for both the power and firing circuits in the regulator. It is supplied through resistor 26 to zener diode 28 which clips and rectifies it to about 20 volts D.C. As hereafter described, the peak of this voltage is used as the reference voltage.

After being clipped, the rectified voltage of about 20 volts is fed through a low current rectifier 30 to capacitor 32 which charges to the peak zener voltage. This then constitutes the reference voltage and is held constant at a predetermined magnitude of say 20 volts minus the small drop occurring in diode 30. The reference voltage also serves as the power supply voltage for amplifying transistor 34.

Resistor 35 is connected to the emitter of transistor 34 and therefore is useful in serving an emitter follower function in stabilizing the gain of the regulator against changes in transistor properties and in providing gain adjustment. It also provides a high input impedance to transistor 34 to obtain better operation of the stabilizing network.

The clipped zener voltage also supplies power to the unijunction transistor 36 through resistor 38 for keeping operation of the firing circuit synchronized with the line voltage. Resistor 38 serves primarily as a temperature compensator and compensates the firing voltage of the transistor against changes in temperature.

The reference voltage fed to transistor 34 in combination with the sensed voltage from point 24 controls the charging of timing capacitor 40 which charges until the peak voltage is reached. A resistor 42 and the gate of silicon controlled rectifier 44 are connected to the output of transistor 36.

The stabiizing circuit includes a resistor 46 connected between fine adjustment potentiometer 22 and the base of transistor 34. This resistor helps to maintain the voltage on the transistor base at the same level as the reference voltage when no changes are taking place in the load and the generator is supplying constant voltage. It also protects the transistor from the application of sudden voltage surges which otherwise would be harmful to it. The lag network, consisting of resistors 46 and 48 and capacitor 50, makes possible high gain while maintaining a stable system.

*Operation*

When a decrease in the alternator load voltage occurs thus indicating the need for an increase in the exciter output serving the alternator field winding, to maintain a constant voltage output, the sensed voltage is reduced in magnitude and rectified by the rectifiers 16. It then is applied through resistor 46 to the base of transistor 34. At this time, the reference voltage appearing across terminals $T_3$ and $T_4$ will not have changed because the zener diode 28 maintains the reference voltage at a predetermined value regardless of changes in the load voltage. Assuming the sensed voltage to be less than the reference voltage of about 20 volts, say 18 volts, the difference voltage converts the transistor 34 to a conducting state and the capacitor 40 charges until it reaches the peak voltage established by zener diode 28. The path for the charging current flow is through diode 30, potentiometer 35 and transistor 34.

The characteristics of transistor 36 are such that when the voltage on the capacitor 40 reaches about 50-70% (depending upon the transistor parameters) of the voltage across the zener diode 28, the transistor 36 impedance drops and capacitor 40 discharges through it to resistor 42 and the gate of controlled rectifier 44. The controlled rectifier 44 then conducts and voltage in the positive half of the cycle is applied to the exciter field. This increases the exciter voltage output which is supplied to the alternator field winding thus raising the voltage at the alternator load terminals. As indicated previously, this voltage can be applied directly to the alternator field winding if desired.

Since the alternator armature voltage applied to the exciter field from line 1 and the neutral N goes negative after the first half cycle, a positive voltage will not be available to be clipped by zener diode 28 and the capacitor 40 therefore will not recharge during the negative half cycle. This mode of operation of the circuit makes possible the charging and discharging of capacitor 40 in synchronism with the line voltage. However, the reference voltage is maintained across $T_3$–$T_4$ because capacitor 32 will start discharging at the beginning of the negative half of the cycle. The diode 30 blocks current flow toward zener diode 28. The discharge path for the capacitor is through transistors 34, 36 and resistor 42. Discharge through transistor 36 occurs because the interbase voltage is removed but the current flow therethrough is not great enough to have any appreciable effect on the circuit components. Capacitor 40 will not be charged by the discharge from capacitor 32 because it is short circuited by transistor 36 and resistor 42.

The resistor 52 connected across the exciter field 12 is used in obtaining an initial buildup of voltage in the field winding. It causes the controlled rectifier 44 holding current to hold it in a conducting state during the time when it first fires. During the negative half cycle, the controlled rectifier turns off the current is circulated through the field and rectifier 54. In those installations where a controlled rectifier having a low holding current is used, the resistor 52 is not needed.

When the next positive half cycle starts, if the sensing voltage from the alternator does not match the reference voltage, the same procedure outlined above is repeated, and for every additional cycle thereafter, until the alternator provides a constant voltage at the desired magnitude to the load.

Since the transistor 34 controls the charging current for capacitor 40, it will be made conducting at an earlier time in the cycle as the difference between the sensed voltage and the reference voltage increases. A greater magnitude of current therefore will flow to capacitor 40 thus charging it sooner. The peak voltage on capacitor 40 accordingly will be reached in a shorter time causing it to discharge sooner and thus turn on the controlled rectifier 44 at an earlier time in the positive half of the cycle. Since the controlled rectifier will conduct for a longer period, voltage will be supplied to the exciter field for a longer period of time, thereby providing the larger amount of power needed and which corresponds to the requirements of the alternator to hold the output voltage constant.

It will be apparent to those skilled in the art that with the regulator basic circuits and teachings provided by the description of FIGURE 1, many minor changes can be made therein to control different varieties of electrical equipment.

For example, as illustrated in FIGURE 2, the regulator may be used for speed control purposes rather than control of an alternator output voltage. To obtain constant speed output from equipment driven by an alternating current motor, eddy current clutches of the type identified by the trademark Kinetrol are connected between the motor and the driven equipment.

This well known eddy current coupling includes a tachometer 60 mounted on the variable speed shaft and includes a permanent magnet stator and a shaft mounted armature winding connected to a commutator. The armature winding produces a D.C. voltage at the commutator proportional to speed and is supplied to terminals $T_8$–$T_9$, instead of the rectified alternator voltage of FIGURE 1. As is apparent, the field of the eddy current clutch 60 replaces the exciter field of FIGURE 1. Since the objective is to maintain the output shaft speed at a constant value, the tachometer senses changes in the speed as corresponding changes take place in the load. It then supplies a sensed output voltage to the terminals $T_8$–$T_9$ of the sensing circuit which is greater or less than a predetermined voltage. The circuits of FIGURE 1 then operate in the manner previously described to adjust the field current of the coupling to control the speed of the output shaft.

In another arrangement, the regulator may be used for controlling the speed of a D.C. shunt wound motor by adjusting the motor field. To do this, it is necessary to reverse the sense of the field current change versus speed. The circuit changes to FIGURE 1 necessary for accomplishing this objective simply include changing the emitter and base connections of transistor 34, which in turn changes the polarity of the rectifier output compared to the error signal so that as the error signal increases in a positive direction, the output voltage to the field increases. The signal from the tachometer then would show an increase in voltage thus indicating a higher speed. If the remaining circuits of FIGURE 1 were used, and the field of a shunt motor substituted for the exciter field winding, the increase in voltage would have the effect of slowing it down.

In lieu of using the half wave rectifier connection in the sensing circuit of FIGURE 1, a full wave rectifier for changing the alternator voltage may be used in the manner illustrated in FIGURE 3. The alternator windings 10 are connected to the positive terminal $T_1$ through rectifiers 62, and to the negative terminal $T_2$ through rectifiers 64 for providing full wave rectified voltage to the power circuit. To reduce the magnitude of the voltage supplied to the sensing circuit, a resistor 60 is connected between the positive line $T_1$ and the potentiometer 22. Filtering of this voltage is accomplished by the filter capacitor 68. These elements in the full wave rectifier replace the resistors 14 and rectifiers 16 of FIGURE 1.

The advantages gained by utilizing a full wave rectifier bridge of this design is a greater amount of power is made available to the controlled rectifier 44 and the voltage goes to zero twice per cycle, and therefore provides a faster response in the regulator and less ripple voltage in the field winding 12. Moreover, the separate sensing rectifiers are eliminated from this circuit. The single phase power source is more suitable for single phase generators and there is reduced current loading on the generator for the same power.

FIGURES 4 and 5 illustrate a circuit arrangement used to obtain the application of D.C. power to the field winding 12 of FIGURE 1 for a period of time longer than that in the previous modifications. In the FIGURE 1 half wave regulator, power is supplied to the field for up to 180° whereas FIGURE 4 will furnish almost twice the amount of excitation power by keeping controlled rectifier 44 turned on for up to 240°.

As shown, the cathodes of the two power rectifiers 70 and the low current rectifier 72 are connected to the alternator windings while their anodes have a common connection to the negative side of the line $T_2$. When the sensing circuit connected to terminals $T_5$, $T_6$ and $T_7$ detects a change in output voltage, the stabilizing, firing, and voltage reference circuits and the power circuit become operative to convert the controlled rectifier 44 to a conducting state and thus supply excitation power through terminals $T_1$ and $T_2$ to the exciter field winding. The curves of FIGURE 5A show the voltage wave forms for each phase of the alternator supplying power to the load, while FIGURE 5B illustrates the wave form for the voltage supplied to the field winding through terminals $T_1$ and $T_2$, and the controlled rectifier 44, of 240°. The voltage between terminals $T_1$ and $T_2$ is a rectified voltage and is shown by FIGURE 5B. Its peak magnitude which is positive for 240° is equal to the peak line to line voltage. As shown, it is zero for 120°. The voltage of terminal $T_2$ follows the bottom envelop of the voltage wave forms shown in FIGURE 5A. Terminal $T_1$ is connected directly to phase A. The resultant $T_1$–$T_2$ voltage is shown in FIGURE 5B and is the difference between phase A voltage and the bottom envelop of the voltage 5A. During the zero period, the controlled rectifier 44 turns off and the field current is carried by rectifier 54.

The voltage wave shape shown in FIGURE 5B provides a higher ratio of average voltage to the peak voltage than that obtainable from FIGURE 1. This means more power can be supplied to the field winding by the same controlled rectifier. Also this rectifier is not required to hold off any reverse voltage and therefore reduces the chances of failure of the controlled rectifier. These cycles are repeated until the voltage supplied to the regulator by the sensing circuit equals the reference voltage.

Figure 7A:
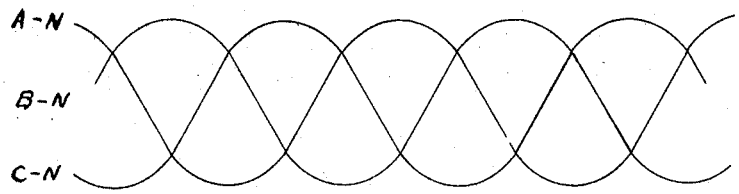
Figure 7B:
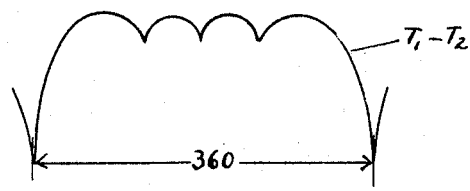

The modification of FIGURE 6 and curves of FIGURE 7 are similar to FIGURES 4 and 5 and consists of an additional power circuit useful with the regulator circuits of FIGURE 1. The power rectifiers 70 are connected in the circuit in the same manner as FIGURE 4. The anodes of rectifiers 74 and 76 are each connected to a phase of the alternator while the cathodes are connected to the line $T_1$. With this arrangement, power is supplied to the field winding for 360° and goes to zero once per cycle. The wave shape of the $T_1$ to $T_2$ voltage in FIGURE 6 is the voltage applied to the regulator power circuit and is shown in FIGURE 7B. The potential of terminal $T_2$ follows the bottom envelop of the phase voltage shown in FIGURE 7A. Terminal $T_1$ potential follows the upper envelop of terminals A and C. The resultant $T_1$–$T_2$ voltage is the difference between these two envelops and shown in FIGURE 7B.

Figure 9B:
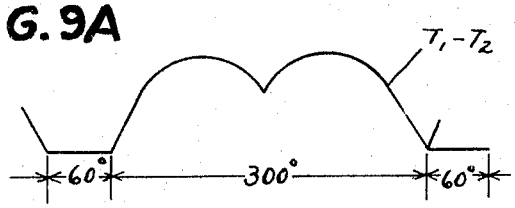

FIGURES 8 and 9 illustrate still another circuit design and in this case, positive voltage is supplied to the field for 300°. The anodes of rectifier 78 are connected respectively to terminals $T_5$ and $T_6$ while the cathodes are connected on the line $T_1$ supplying power to the regulator power circuit. In this arrangement, the controlled rectifier conducts for up to 300° and supplies power to the field winding during this time. The $T_1$–$T_2$ voltage as shown in FIGURE 9B is zero for 60° to allow turn off of the controlled rectifier. The $T_1$–$T_2$ voltage shown in FIGURE 9B is the upper envelop of phases A and B, since terminal $T_2$ is connected to the neutral.

The modification of FIGURE 10 regulates volts per cycle or voltage proportional to frequency. The sensing circuit shown is connected to the generator armature and preferably, power is supplied at constant voltage and frequency to the firing circuit and power circuit of the regulator from a separate source. When a separate source is used, it is connected to terminals $T_8$ and $T_2$, and power in this situation therefore will not be furnished from the alternator terminals. As shown, the sensing circuit includes a transformer having its primary winding 80 connected to the alternator output terminals. A reactor 80 is connected between the secondary winding 84 and the sensing rectifiers 86 which in turn are connected to terminals $T_8$ and $T_2$.

The input voltage to the sensing circuit from the transformer is shown to be considerably greater than the reference voltage at the lowest desired operating voltage and frequency of the alternator. The reactor 82 is chosen to have a reactance sufficiently high to make the sensed voltage approximately equal to the reference voltage at the desired operating voltage and frequency. The regulator holds the sensed D.C. voltage between terminals $T_8$ and $T_2$ constant.

By choosing the reactor to have a high reactance compared to the resistance of resistor 20 and potentiometer 22, the current through these resistors is determined by the reactor. The magnitude of the reactance is directly proportional to frequency so that the sensed voltage becomes directly proportional to the alternator voltage and inversely proportional to the frequency. Therefore, since the regulator will hold the sensed voltage constant, it will hold the ratio of the alternator voltage to the frequency constant.

Using a separate power source (not shown) for the regulator eliminates the possibility of the alternator not having sufficient power to supply the field voltage. Moreover, better performance of the firing circuit at a fixed frequency is made possible because of the uniform gain characteristics with fixed frequency.

The regulator of FIGURE 11 includes a modified stabilization network to make possible improved regulator performance. The circuits are essentially the same as that described and shown in FIGURE 1 except that instead of connecting lag resistor 48 and capacitor 50 in the firing and reference voltage circuit, they by-pass the regulator and are connected in the power circuit at the exciter field winding. Also the controlled rectifier 44 has been moved ahead of the field winding in order to have a common terminal between the firing circuit and the field winding.

By connecting the resistor and capacitor in the circuit as shown, negative field current feedback around the regulator is now possible. It improves the stabilization of the network by speeding up the response of the regulator to the varying load conditions. To get negative field voltage feedback, capacitor 50 is connected to the other side of the field winding and resistor 93 is omitted.

In operation, when the sensed voltage is less than the reference voltage, transistors 34 and 36 conduct the charge from capacitor 40 to the primary 90 of a pulse transformer. The secondary 91 supplies the necessary current to the gate of controlled rectifier 44 to turn it on and permit the application of power to the exciter field winding. If the additional power supplied by the exciter to the alternator field is not sufficient to maintain the voltage constant at the desired level, the procedure is repeated as described previously.

The negative field current feedback operates by using the voltage across resistor 93 which is in series with the field. When the field current increases, the voltage across the resistor increases. This voltage is fed through capacitor 50 and resistor 48 to the base of the transistor 34. The increase of base voltage is in the direction to turn off the transistor and therefore reduce the field voltage and current. The connection therefore does produce negative feedback. Capacitor 50 prevents D.C. feedback so that good steady-state regulation is obtained while maintaining good transient response and stability.

FIGURE 12 illustrates a circuit for flashing the exciter field to obtain build-up of voltage when the alternator output voltage is at a very low level. This circuit may be used with all of the regulators described above although some components may be omitted in some cases if desired.

The exciter field winding 12 is connected to the alternator terminals as before. The voltage from the alternator may not be sufficient to obtain normal operation of the firing circuit. In this case, the relay coil 92 has normally closed contacts 94 and when the voltage is not great enough to pick up the contacts, resistor 96 is connected from anode to the gate of the controlled rectifier through the diodes 98 and 100 shown. With this connection, it takes only a very low voltage to turn the controlled rectifier on and start rectifying the alternator voltage to provide field current. This causes the alternator voltage to build-up rapidly until sufficient field current flows through the relay coil 92 to pick up the relay. At this time, enough voltage is available for normal operation of the firing circuit. The rectifier 102 by-passes the relay coil 92 in normal operation to prevent excessive loss in the coil or in the field circuit. Rectifier 100 prevents firing circuit energy from being diverted into the flashing circuit. It also blocks negative voltage from the gate of the controlled rectifier 44 if rectifier 98 is omitted. Rectifier 104 prevents flashing circuit gate power from being diverted into the firing circuit. This can be omitted in many cases. Rectifier 98 prevents reverse current flow through resistor 96 and the capacitor 106 but it can be omitted and the circuit will still function. Capacitor 106 in combination with resistor 96 is used to prevent the application of instantaneous high voltage to the gate of the silicon controlled rectifier in the event that the relay contacts 94 (or push button, if manual operation is used) close when normal voltage is on the alternator. If this situation cannot occur, the capacitor 106 can be omitted along with resistor 96 and diode 98.

In lieu of locating the coil 92 in the exciter field circuit, it may be connected to the alternator terminals as shown by A in FIGURE 12.

In view of the above, it will be apparent that many variations and modifications, other than those disclosed above, will occur to those skilled in the art. It therefore is to be understood that within the scope of the appended claims, the invention may be practiced other than as specifically described.

What I claim as new and desire to secure by Letters Patent of the United States is:

1. A voltage regulator useful in controlling the operation of rotating electrical equipment including an alternator having an output winding and corresponding output terminals, said regulator comprising a sensing circuit connected to the output terminals of the alternator and including voltage reduction and rectifying means for providing a sensed voltage proportional to the voltage at the output terminals, a field winding and a first semiconductor device connected to at least one phase of the alternator winding, a firing and reference voltage circuit connected to the output terminals of said alternator winding, said circuit including a constant voltage semiconductor device effective in establishing a reference voltage, selectively operable conducting means connected to said constant voltage semiconductor device and to said sensing circuit, said conducting means being responsive to the difference voltage resulting from the difference between the reference voltage and the sensed voltage furnished by the sensing circuit, the arrangement being such that when the difference voltage reaches a predetermined value, the conducting means is converted to a conducting state to charge a capacitor associated therewith, stabilizing means between the sensing and firing and reference voltage circuits for improving the performance of the alternator, synchronizing means in the firing and voltage reference circuit including a conductive element connected between said capacitor and the first semiconductor device, said synchronizing means being effective in permitting the firing circuit voltage to decrease to zero at least once per cycle and permitting the capacitor to discharge at least one per cycle, thereby obtaining synchronization between the line voltage and the time the capacitor begins to charge.

2. The combination according to claim 1 wherein a diode and a capacitor are connected between the constant voltage semiconductor device and said first semiconductor device for maintaining the reference voltage at a constant predetermined value during a complete cycle of alternating voltage.

3. The combination according to claim 1 wherein a flashing circuit is connected to the field winding for establishing current flow therein when the voltage applied to the field is at an extremely low value, said flashing circuit comprising a relay including a coil responsive to the current flowing in the field winding, contacts for said coil serially connected with a resistive element and a semiconductor device connected in parallel with said first semiconductor device for providing gate current thereto for converting it to a conducting state, said contacts being normally closed so that when the current in the field winding reaches a predetermined value, the coil opens said contacts and permits the circuits of claim 5 to control the said first semiconductor device.

4. A voltage regulator useful in maintaining the output voltage of an alternator at a constant value comprising:

rectifying means connected to the alternator output winding, a sensing circuit connected to respond to voltages originating in the alternator output winding, a power circuit including a field winding and a semiconductor device connected to said rectifying means, a firing and reference voltage circuit connected with said rectifying means, said rectifying means being connected to provide energizing power for each of said aforementioned circuits which is positive for more than 180° per cycle and goes to substantially zero at least once per cycle, said firing and reference voltage circuit including a constant voltage semiconductor device which provides a reference voltage and a firing circuit supply voltage, a selectively operable conducting device connected to said constant voltage semiconductor device and being responsive to the difference between the sensed voltage and the reference voltage, synchronizing means in the firing and voltage reference circuit including a conductive element connected between said capacitor and the first semiconductor device, said synchronizing means being effective in permitting the firing circuit voltage to decrease to zero at least once per cycle and permitting the capacitor to discharge at least once per cycle, thereby obtaining synchronization between the line voltage and the time the capacitor begins to charge, so that when said capacitor converts the first semiconductor device to a conducting state, excitation voltage is applied to the field winding.

5. The combination according to claim 4 wherein said rectifying means include at least two of the rectifiers having their cathodes connected to the alternator winding, a low current rectifier having its cathode connected to said sensing circuit, said rectifiers having their anodes connected to a common terminal in the negative power line, the arrangement being such that positive power is supplied to the field winding for 240° for each cycle and goes to zero at least once per cycle.

6. The combination according to claim 5 wherein said rectifying means further include a pair of rectifiers respectively having their anodes connected to phases in the alternator winding and their cathodes to the positive power line, the arrangement being such that power is supplied to the field winding for 360° for each cycle but goes to zero at least once per cycle.

7. The combination according to claim 4 wherein said rectifying means comprise a pair of rectifiers respectively having their anodes connected to two phases of the alternator output winding and their cathodes to the positive power line, the arrangement being such that positive power is supplied to the field winding for 300° for each cycle but goes to zero at least once per cycle.

8. A voltage regulator useful in controlling the operation of rotating electrical equipment including an alternator having an output winding and corresponding output terminals, said regulator comprising:

a sensing circuit connected to the output terminals of the alternator and including voltage reduction and rectifying means for providing a sensed voltage proportional to the voltage at the output terminals, a field winding and a first semiconductor device connected to at least one phase of the alternator output winding, a firing and reference voltage circuit connected to the output terminals of said alternator winding, said circuit including a constant voltage semiconductor device effective in establishing a firing and reference voltage in said circuit, selectively operable conducting means connected to said constant voltage semiconductor device and to said sensing circuit, said conducting means being responsive to the difference voltage resulting from the difference between the reference voltage and the sensed voltage furnished by the sensing circuit, the arrangement being such that when the difference voltage reaches a predetermined value, the conducting means is converted to a conducting state to charge a capacitor associated therewith, stabilizing means between the sensing and firing and reference voltage circuits for improving the performance of the alternator, said stabilizing means comprising a resistor and a capacitor connected between said selectively operable conducting means and said field winding for providing a negative feedback voltage to the firing and reference voltage circuits, a conductive element connected between said capacitor and said first semiconductor device having characteristics such that it becomes conducting when the voltage on said capacitor reaches a predetermined value, so that when the capacitor discharges through said conducting device to the first semiconductor device, the latter becomes conducting and permits the application of excitation power to the field winding and in a magnitude corresponding to the change in voltage at the alternator output terminals, and a pulse transformer connected in the output of said conductive element and having a secondary winding connected to the gate of said first semiconductor device for converting the latter to a conducting state and thereby permitting the application of excitation voltage to the field winding.

References Cited by the Examiner

UNITED STATES PATENTS

| | | | |
|---|---|---|---|
| 3,009,091 | 10/1961 | Halliday | 322—28 |
| 3,069,616 | 12/1962 | Curtis | 322—73 XR |
| 3,151,288 | 9/1964 | Avizienes et al. | 322—73 |
| 3,201,624 | 8/1965 | Wilkerson | 318—326 |

JOHN F. COUCH, *Primary Examiner.*

LLOYD McCOLLUM, *Examiner.*

W. H. BEHA, *Assistant Examiner.*